US008946552B2

(12) United States Patent
Li et al.

(10) Patent No.: US 8,946,552 B2
(45) Date of Patent: Feb. 3, 2015

(54) HIGH VOLTAGE DIRECT CURRENT CABLE TERMINATION APPARATUS

(71) Applicants: Ming Li, Vasteras (SE); Markus Saltzer, Fislisbach (CH); Uno Gafvert, Vasteras (SE); Cecilia Forssen, Vasteras (SE); Mikael Unge, Vasteras (SE); Jorgen Svahn, Alingsas (SE)

(72) Inventors: Ming Li, Vasteras (SE); Markus Saltzer, Fislisbach (CH); Uno Gafvert, Vasteras (SE); Cecilia Forssen, Vasteras (SE); Mikael Unge, Vasteras (SE); Jorgen Svahn, Alingsas (SE)

(73) Assignee: ABB Research Ltd. (CH)

( * ) Notice: Subject to any disclaimer, the term of this patent is extended or adjusted under 35 U.S.C. 154(b) by 251 days.

(21) Appl. No.: 13/683,718

(22) Filed: Nov. 21, 2012

(65) Prior Publication Data
US 2013/0075124 A1    Mar. 28, 2013

Related U.S. Application Data

(63) Continuation of application No. PCT/EP2010/057062, filed on May 21, 2010.

(51) Int. Cl.
*H02G 15/00* (2006.01)
*H02G 15/20* (2006.01)
*H02G 15/22* (2006.01)
*H02G 15/04* (2006.01)
*H01B 17/26* (2006.01)
*H02G 15/064* (2006.01)

(52) U.S. Cl.
CPC ............. *H02G 15/22* (2013.01); *H02G 15/064* (2013.01)
USPC ............... 174/73.1; 174/8; 174/19; 174/74 R; 174/142

(58) Field of Classification Search
USPC .............................. 174/8, 19, 73.1, 74 R, 142
See application file for complete search history.

(56) References Cited

U.S. PATENT DOCUMENTS

| | | | | |
|---|---|---|---|---|
| 3,439,110 | A | * | 4/1969 | Lusk ............................ 174/73.1 |
| 4,738,318 | A | | 4/1988 | Boettcher et al. |
| 4,774,385 | A | * | 9/1988 | Toshima ........................ 174/142 |
| 5,130,495 | A | * | 7/1992 | Thompson .................... 174/73.1 |

(Continued)

FOREIGN PATENT DOCUMENTS

| | | |
|---|---|---|
| DE | 3822288 A1 | 1/1990 |
| DE | 19845006 C1 | 4/2000 |

(Continued)

OTHER PUBLICATIONS

International Preliminary Report on Patentability Application No. PCT/EP2010/057062 Date: Oct. 10, 2012 19 pages.

(Continued)

*Primary Examiner* — Timothy Thompson
*Assistant Examiner* — Sherman Ng
(74) *Attorney, Agent, or Firm* — St. Onge Steward Johnston & Reens LLC (57) ABSTRACT

A direct current cable termination apparatus for terminating a high voltage direct current cable, the apparatus includes a current-carrying device comprising a terminal portion of the direct current cable, the cable includes an electrical conductor, a circumferential electrically insulating layer located outside of the electrical conductor, and a circumferential conductive shield located outside of the insulating layer and the electrical conductor. The apparatus includes a housing having an outer shell, and the current-carrying device is adapted to extend in the axial direction of the outer shell. Along at least a part of the axial extension of the current-carrying device the outer shell extends axially with a space between its inner periphery and the current-carrying device.

21 Claims, 3 Drawing Sheets

(56) References Cited

U.S. PATENT DOCUMENTS

| | | | |
|---|---|---|---|
| 5,406,030 A * | 4/1995 | Boggs | 174/73.1 |
| 5,466,891 A * | 11/1995 | Freeman et al. | 174/142 |
| 6,124,549 A | 9/2000 | Kemp et al. | |
| 7,262,367 B2 | 8/2007 | Donzel et al. | |
| 7,495,172 B2 | 2/2009 | Amerpohl | |
| 2007/0272428 A1 | 11/2007 | Bayon et al. | |
| 2009/0071684 A1 | 3/2009 | Zhang | |
| 2010/0200274 A1 * | 8/2010 | Jonsson et al. | 174/137 B |

FOREIGN PATENT DOCUMENTS

| | | |
|---|---|---|
| EP | 1736998 A1 | 12/2006 |
| EP | 2026438 A1 | 2/2009 |
| WO | 2004038735 A1 | 5/2004 |
| WO | 2006015735 A1 | 2/2006 |
| WO | 2007147755 A1 | 12/2007 |
| WO | 2008076058 A1 | 6/2008 |
| WO | 2009125568 A1 | 10/2009 |

OTHER PUBLICATIONS

International Search Report & Written Opinion of the International Searching Authority Application No. PCT/EP2010/057062 Completed: Mar. 1, 2012; Mailing Date: Mar. 13, 2012 10 pages.

Written Opinion of the International Preliminary Examining Authority Application No. PCT/EP2010/057062 Date: Jul. 25, 2012 7 pages.

* cited by examiner

HIGH VOLTAGE DIRECT CURRENT CABLE TERMINATION APPARATUS

FIELD OF THE INVENTION

The present invention relates to a direct current cable termination apparatus for terminating a high voltage direct current cable, HVDC, cable. The apparatus may comprise a current-carrying device comprising a terminal portion of the direct current cable, the cable at least comprising an electrical conductor, a circumferential electrically insulating layer located outside of the electrical conductor, and a circumferential conductive shield located outside of the insulating layer and the electrical conductor. The apparatus may comprise a housing comprising a tubular outer shell with an inner periphery, the outer shell defining a longitudinal axis and being formed by an electrically insulating and polymer-containing material, and the current-carrying device is adapted to extend in the axial direction of the outer shell. Along at least a part of the axial extension of the current-carrying device the outer shell may extend axially with a space between its inner periphery and the current-carrying device, and the housing is adapted to separate the space from an atmosphere outside the outer shell. Further, the present invention relates to an electric installation comprising an apparatus of the above-mentioned kind.

BACKGROUND OF THE INVENTION

Today, the level of the rated voltage of high voltage direct current, HVDC, applications is increased in the technical field of HVDC. With this development, improved HVDC cable terminations, which can withstand higher voltage levels, are required.

A HVDC cable is used for power supply in power distribution networks and power transmission networks. Generally, the HVDC cable comprises at least an inner or central live electrical conductor, e.g. made of copper or aluminium, an electrically insulating layer which circumferentially surrounds the electrical conductor, and a conductive shield, also called outer semicon, which circumferentially surrounds the insulating layer and the electrical conductor, the conductive shield being held on ground potential. Additional layers may be present, e.g. a so called inner semicon, which is a conductive layer circumferentially surrounding the electrical conductor and located inside of the insulating layer, and e.g. an outer cable jacket circumferentially surrounding the conductive shield.

When the HVDC cable is electrically connected to other electric equipment, the HVDC cable is terminated or cut off. When terminating a HVDC cable, measures should be taken to ensure durable and reliable electrical performance and to protect the connection between the end of the HVDC cable and the electric equipment to which the end of cable is connected. When terminating a HVDC cable, the conductive shield and the electrically insulating layer, and possibly any further present layers, are terminated, or cut off, prior to the termination of the inner electrical conductor in order to expose the electrical conductor and connect it to the electric equipment.

WO20071147755-A1 discloses a cable termination for terminating a HVDC cable, the termination being provided with a device for electric field control including a field grading material layer adapted to be electrically connected to a live high voltage part and electrically connected to ground potential.

US2009/0071684-A1 describes a high voltage power cable termination.

WO2006/015735-A1 discloses an open-air cable sealing end for a high-voltage cable, comprising an outer shell and an electrically conducting connecting line, the outer shell extending axially with a space between its inner periphery and the connecting line, and the space is filled with an electrically insulating gas, e.g. sulphur hexafluoride, $SF_6$.

SUMMARY OF THE INVENTION

One object of the present invention is to provide an improved high voltage direct current, HVDC, cable termination, which may withstand high voltage levels. It is a further object of the present invention to improve the electric insulation properties of a HVDC cable termination. It is also an object of the present invention to improve the mechanical performances of a HVDC cable termination.

The above-mentioned objects of the present invention may be attained by providing a direct current cable termination apparatus for terminating a high voltage direct current cable (a DC cable for voltages at e.g. 50 kV and above), the apparatus comprises a current-carrying device comprising a terminal portion of the direct current cable, the cable at least comprising an electrical conductor, a circumferential electrically insulating layer located outside of the electrical conductor, and a circumferential conductive shield located outside of the insulating layer and the electrical conductor, a housing comprising a tubular outer shell with an inner periphery, the outer shell defining a longitudinal axis and being formed by an electrically insulating and polymer-containing material, the current-carrying device being adapted to extend in the axial direction of the outer shell, along at least a part of the axial extension of the current-carrying device the outer shell extends axially with a space between its inner periphery and the current-carrying device, the housing is adapted to separate the space from an atmosphere out-side the outer shell, wherein the apparatus comprises a partition which separates the space into a first chamber and a second chamber, the first chamber is filled with an electrically insulating first fluid and the second chamber is filled with an electrically insulating second fluid other than the first fluid, the conductive shield terminates inside the second chamber, and at least one electric field control member is located within the second chamber in the proximity of the termination of the conductive shield.

Generally, the first chamber may be adjacent to the high voltage side, e.g. an overhead line, or the electric equipment to which the cable is to be connected, and the cable enters the termination apparatus via the second chamber.

The circumferential conductive shield, also called outer semicon or screen, terminates inside the outer shell and forms a termination in the form of a circumferential edge (also called semicon edge). The inventors of the present invention have identified the termination of the circumferential conductive shield, also called outer semicon, which generally is held on ground potential, as a main problem zone, where the highest electric field and electric field stress is found. This is also the reason for providing an electric field control member, e.g. a so called stress cone, in the proximity of the termination of the conductive shield, which is a prior art measure. By providing the termination of the conductive shield and the electric field control member inside a second chamber which is separated from a first chamber adjacent to the high voltage side of the termination, and by filling the two chambers with different insulating fluids, an efficient control of the electric field and a reduction of the electric field stress may be attained, and the cable termination according to the present invention is more flexible and may be tailored in an efficient way to various applications. By providing the electric field control member in the second chamber, the potential distribution along the outer shell is efficiently improved. With reference to the above, an improved cable termination for high voltage is provided, which withstands higher voltage levels, and where the electric insulation properties and the mechanical performances are improved.

Each of the first and second insulating fluids may be in the form of a liquid, e.g. oil or gel, a gas, or a gas mixture etc.

The electrically insulating and polymer-containing material of the outer shell may comprise one polymer or a plurality of polymers. The material may be a composite, a reinforced epoxy or a resin. The polymer can be a thermoplastic polymer, e.g. polybutylene terephthalate (PBT) or polyester, or a thermosetting polymer, e.g. thermosetting resin. The shell may be in the form of an epoxy reinforced structure. According to an advantageous embodiment of the apparatus according to the present invention, the outer shell is formed by a polymer or a plurality of polymers. The outer shell may be provided with an outer cover of silicone, e.g. in the form of sheds, or wings.

Advantageously, the electric field control member is positioned around the current-carrying device. There are several known electric field control members which may be used and are known to the person skilled in the art, and the electric field control member is therefore not discussed in more detail hereinafter. The electric field control member may for example be a stress cone, and may for example comprise a rubber or elastomeric body stretched over the current-carrying device, and an earth electrode may be applied to the rubber body to distribute the electric field, or the equipotential lines between the high voltage side and earth, to prevent electric field stress and electric field concentrations.

The DC cable may comprise further layers, e.g. an outer cable jacket circumferentially surrounding the conductive shield, which is known to the skilled person and thus not discussed in more detail hereinafter.

According to an advantageous embodiment of the apparatus according to the present invention, the current-carrying device comprising a terminal portion of a High Voltage Direct Current, HVDC, cable. Generally, the conductive shield is held on ground potential.

The apparatus according to the present invention is especially advantageous for terminating DC cables for voltages above 200 kV.

According to an advantageous embodiment of the apparatus according to the present invention, a first part of the terminal portion of the cable has the circumferential conductive shield, whereas a remainder part of the terminal portion of the cable has the conductive shield removed, and the first part is situated within the second chamber and outside the first chamber. Hereby, an improved cable termination for high voltage is provided.

According to a further advantageous embodiment of the apparatus according to the present invention, the first fluid comprises an electrically insulating gas, and the second fluid comprises a liquid filler. The liquid filler, or liquid medium, may be in the form of a liquid, e.g. oil, gel etc., or mixtures thereof. The insulating gas may be a gas mixture. Insulating gas, e.g. $SF_6$, $N_2$, or $CO_2$, is easy to handle on site, has a low weight and has an advantageous convection cooling effect. By providing the termination of the conductive shield in the liquid-filled second chamber, the problem zone in the form of the conductive shield termination is separated from the gas-filled region, i.e. the first chamber, adjacent to the high voltage side. Hereby, the risk of electrical breakdown in the electrically insulating gas of the first chamber is decreased, and an improved electric field control is provided. Further, when entering the outer shell of the apparatus, the terminal portion of the DC cable still has the earthed circumferential conductive shield. Thus, during operation, the terminal portion of the DC cable thermally expands and contracts in the radial direction at the interface between cable and the cable entry/opening of the outer shell, which may cause problems with regard to the sealing between the cable and the outer shell. However, by providing a fluid in the second chamber into which the cable enters the outer shell, instead of a gas, which would more easily leak via the interface between the cable and the outer shell, an improved sealing at the cable entry of the outer shell is provided. Consequently, the sealing arrangement at the cable entry of the outer shell may be less sophisticated and thus less expensive in relation to prior art sealing. Thus, the apparatus according to this embodiment is easier to manufacture. By this embodiment, an improved HVDC cable termination is provided, where the electric insulation properties and the mechanical performances are improved. Further, the liquid filler provides cooling of the terminal portion of the DC cable.

According to another advantageous embodiment of the apparatus according to the present invention, the liquid filler comprises an electrically insulating gel and/or an electrically insulating oil. Suitable oils and gels are known to the skilled person. By this embodiment, the sealing between the cable and the cable entry of the outer shell and the cooling effect of the cable are further improved, providing an improved HVDC cable termination.

According to yet another advantageous embodiment of the apparatus according to the present invention, the electrically insulating gas comprises $SF_6$, i.e. sulphur hexafluoride, $CO_2$ and/or $N_2$. By this embodiment, the insulation properties and the electric field control of the HVDC cable termination are further improved, providing a further improved HVDC cable termination. Alternatively, the electrically insulating gas may also comprise air, e.g. compressed air.

According to still another advantageous embodiment of the apparatus according to the present invention, the apparatus comprises a fluid circulation unit connected to the second chamber, the fluid circulation unit comprises a circuit for circulation of fluid therein, and the second chamber is part of the circuit. By this embodiment, the cooling effect of the cable is yet further improved, providing an improved HVDC cable termination.

According to an advantageous embodiment of the apparatus according to the present invention, the partition is tubular and is positioned around the current-carrying device. By this embodiment, the partition is efficiently seated in a correct and effective position, and the assembly of the apparatus is facilitated, whereby an improved HVDC cable termination is provided.

According to a further advantageous embodiment of the apparatus according to the present invention, the partition forms a truncated cone-shaped inner shell having a first opening at a first end of the inner shell, the first opening sealing around the current-carrying device. By this shape of the partition, no radially extending wall of the partition adjacent to the current-carrying device is present, which could guide the electric field in a negative way. Thus, an efficient control of the electric field is provided, whereby the HVDC cable termination is further improved.

According to another advantageous embodiment of the apparatus according to the present invention, the partition forms a cylinder-shaped inner shell having a first basis at a first end of the inner shell, the first basis being provided with a first opening which seals around the current-carrying device. By this embodiment, an improved HVDC cable termination is provided.

According to still another advantageous embodiment of the apparatus according to the present invention, the partition forms an inner shell having a dome-shaped end portion, and the dome-shaped end portion of the inner shell is provided with a first opening, the first opening sealing around the current-carrying device. By this shape of the partition, no radially extending wall of the partition adjacent to the current-carrying device is present, which could guide the electric field in a negative way. Thus, an efficient control of the electric field is provided, whereby the HVDC cable termination is further improved.

According to yet another advantageous embodiment of the apparatus according to the present invention, along at least a part of the axial extension of the partition the outer shell extends axially with a gap between its inner periphery and the partition. By the gap of this embodiment, the control of the electric field is further improved, whereby a further improved HVDC cable termination is provided.

According to yet another advantageous embodiment of the apparatus according to the present invention, along the axial extension of the electric field control member the partition extends axially with a gap between its inner periphery and the electric field control member. By the gap of this embodiment, the control of the electric field is further improved, whereby a further improved HVDC cable termination is provided. However, said gap between the electric field control member and the partition may be excluded in some embodiments.

According to an advantageous embodiment of the apparatus according to the present invention, the outer shell has a first end portion adjacent to the first chamber and a second end portion adjacent to the second chamber, the current-carrying device comprises a connecting body in which the electrical conductor terminates, the connecting body being adapted to electrically connect the terminated electrical conductor to an electrically conducting member adapted to extend axially in the first chamber and to form part of the current-carrying device, and at least a portion of the connecting body is situated in the first chamber. By providing the connecting body in the first chamber, which may be filled with insulating gas, an efficient electric field control is provided, whereby the HVDC cable termination is further improved. The connecting body may comprise connecting elements which connect the terminated electrical conductor to the conducting member and may comprise screws and a static conductive screen/shield. The conducting member may be in the form of a rod, e.g. made of aluminium or copper. Having a bare conducting member in the first chamber, which is gas-filled, e.g. with $SF_6$, is of benefit to the thermal performance of the DC cable termination.

According to a further advantageous embodiment of the apparatus according to the present invention, the entire connecting body is situated within the first chamber and outside the second chamber. By providing the entire connecting body in the first chamber, the electric field control is further improved, whereby the HVDC cable termination is further improved.

According to another advantageous embodiment of the apparatus according to the present invention, the partition abuts against the connecting body. Hereby, the partition is efficiently seated in a correct position, and the assembly of the apparatus is further facilitated.

According to yet another advantageous embodiment of the apparatus according to the present invention, the second fluid is in physical contact with the connecting body. By this fluid contact, the electric field control is further improved According to still another advantageous embodiment of the apparatus according to the present invention, the partition is situated between the connecting body and the second end portion of the outer shell. Hereby, the partition is efficiently seated in a correct position, and the assembly of the apparatus is further facilitated.

According to an advantageous embodiment of the apparatus according to the present invention, the second chamber is situated between the connecting body and the second end portion of the outer shell. Hereby, the HVDC cable termination is further improved.

According to a further advantageous embodiment of the apparatus according to the present invention, the terminal portion of the cable extends from the second end portion of the outer shell to the connecting body. Hereby, the HVDC cable termination is further improved.

According to another advantageous embodiment of the apparatus according to the present invention, the partition is made of an electrically insulating and polymer-containing material. By this embodiment, the HVDC cable termination is yet further improved. The partition may be made of materials corresponding to the materials mentioned in connection with the outer shell, but material of the partition may be different from the material of the outer shell.

According to yet another advantageous embodiment of the apparatus according to the present invention, the apparatus comprises at least one field grading material layer which is electrically connected to the conductive shield of the terminal portion of the cable and electrically connectable to the electrical conductor of the terminal portion of the cable, and along at least one part of the axial extension of the current-carrying device within the second chamber the at least one field grading material layer extends axially and is positioned around at least the electrical conductor of the terminal portion of the cable. By this embodiment, the electric field control is further improved, whereby a further improved HVDC cable termination is provided. The at least one field grading material layer may be directly, or indirectly, electrically connected, or connectable, to the conductive shield and the electrical conductor, respectively. The at least one field grading material layer may be directly, or indirectly, physically connected, or connectable, to the conductive shield and the electrical conductor, respectively.

A field grading material is a material adapted to grade or to guide the electric field. Examples of so called field grading material, FGM, which can be used for the embodiments of the apparatus according to the present invention are for example mentioned in WO-A1-2008/076058 and EP-A1-1 736 998. However, other suitable FGM may also be used.

According to an advantageous embodiment of the apparatus according to the present invention, the at least one field grading material layer comprises a nonlinear field grading material. According to another advantageous embodiment of the apparatus according to the present invention, the at least one field grading material layer comprises a resistive field grading material. According to a further advantageous embodiment of the apparatus according to the present invention, the at least one field grading material layer comprises a nonlinear resistive field grading material with a resistivity which is a function of the electric field. Alternatively, a capacitive field grading material with field dependent permittivity may be used. By these embodiments, the electric field control is further improved, whereby a further improved HVDC cable termination is provided.

According to still another advantageous embodiment of the apparatus according to the present invention, along the at least one part of the axial extension of the current-carrying device within the second chamber the at least one field grading material layer is positioned around the electrically insulating layer of the terminal portion of the cable. By this embodiment, the electric field control is further improved, whereby a further improved HVDC cable termination is provided.

According to an advantageous embodiment of the apparatus according to the present invention, within the second chamber a first part of the terminal portion of the cable has the circumferential conductive shield, whereas a remainder part of the terminal portion of the cable has the conductive shield removed, and along at least the remainder part of the terminal portion of the cable the at least one field grading material layer extends axially and is positioned around at least the electrical conductor of the terminal portion of the cable. By this embodiment, the electric field control is further improved, whereby a further improved HVDC cable termination is provided. Advantageously, along at least a part of the first part of the terminal portion of the cable the at least one field grading material layer may extend axially and be positioned around at least the circumferential conductive shield of the terminal portion of the cable.

According to a further advantageous embodiment of the apparatus according to the present invention, along the remainder part of the terminal portion of the cable the at least one field grading material layer is positioned around the electrically insulating layer of the terminal portion of the cable. By this embodiment, the electric field control is further improved, whereby a further improved HVDC cable termination is provided.

According to another advantageous embodiment of the apparatus according to the present invention, the electric field control member has an inner periphery facing the current-carrying device, and the electric field control member is positioned around the current-carrying device with the at least one field grading material layer between its inner periphery and the current-carrying device. By this embodiment, the electric field control is further improved, whereby a further improved HVDC cable termination is provided.

According to still another advantageous embodiment of the apparatus according to the present invention, the electric field control member has an outer surface facing the partition, and at least a portion of the outer surface of the electric field control member forms part of the at least one field grading material layer. By this embodiment, the electric field control may be further improved, whereby a further improved HVDC cable termination is provided. Alternatively, the at least one field grading material layer may be embedded in the material of the electric field control member.

Further, the above-mentioned objects of the present invention may be attained by providing an electric installation, comprising a high voltage direct current cable, which at least comprises an electrical conductor, a circumferential insulating layer located outside of the electrical conductor, and a circumferential conductive shield located outside of the insulating layer and the electrical conductor, and comprising a direct current cable termination apparatus for terminating the cable. Positive technical effects of the electric installation according to the present invention, and its embodiments, correspond to the above-mentioned technical effects mentioned in connection with the apparatus according to the present invention, and its embodiments.

The above-mentioned embodiments and features of the direct current cable termination apparatus and the electric installation, respectively, may be combined in various possible ways providing further advantageous embodiments.

Further advantageous embodiments of the direct current cable termination apparatus and the electric installation, respectively, according to the present invention and further advantages with the present invention emerge from the detailed description of embodiments

BRIEF DESCRIPTION OF THE DRAWINGS

The present invention will now be described, for exemplary purposes, in more detail by way of embodiments and with reference to the enclosed drawings, in which.

DETAILED DESCRIPTION OF THE INVENTION

Figure 1:
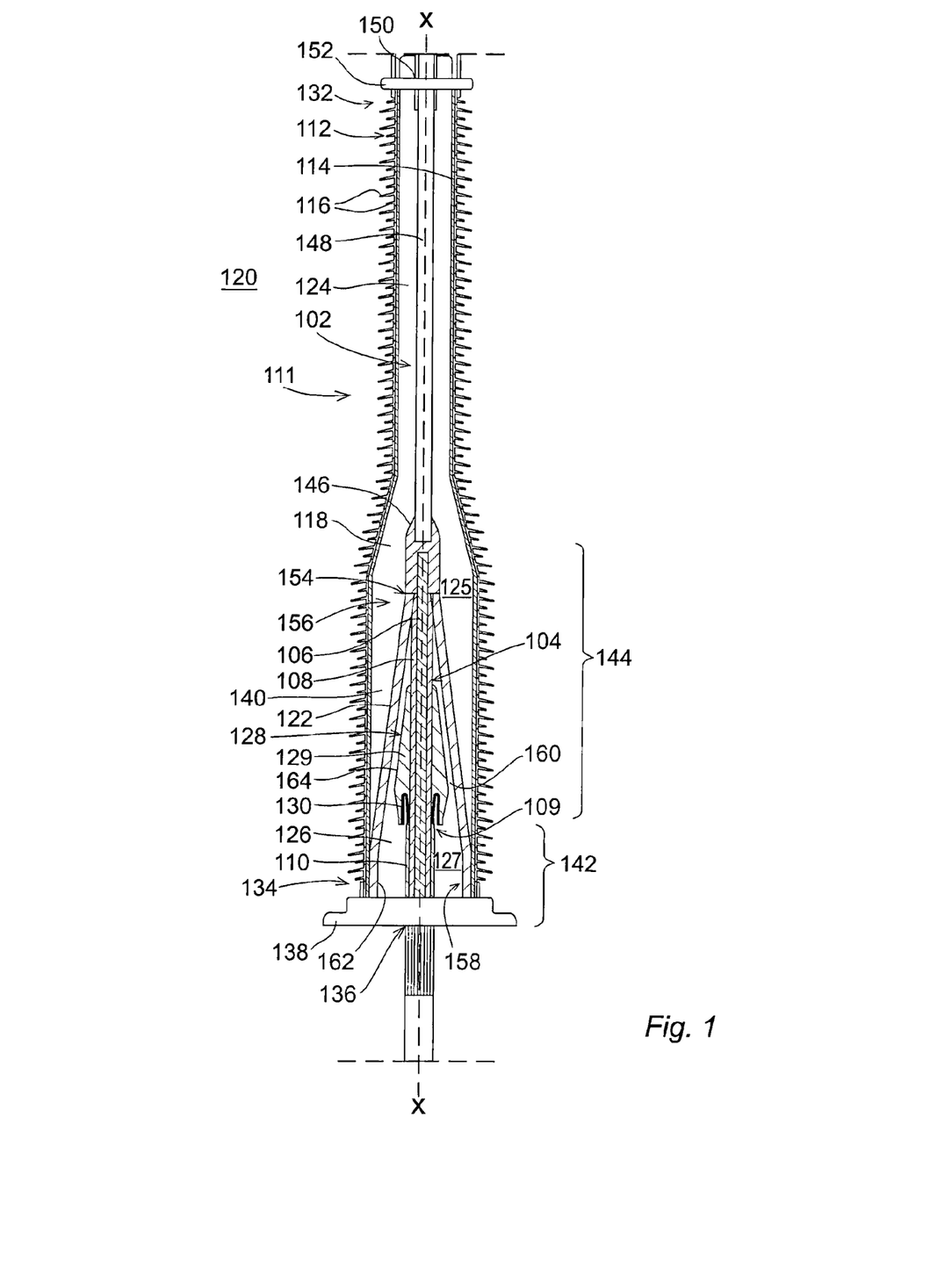
FIG. 1 is a schematic side view showing a longitudinal section of a first embodiment of the direct current cable termination apparatus according to the present invention.
Figure 2:
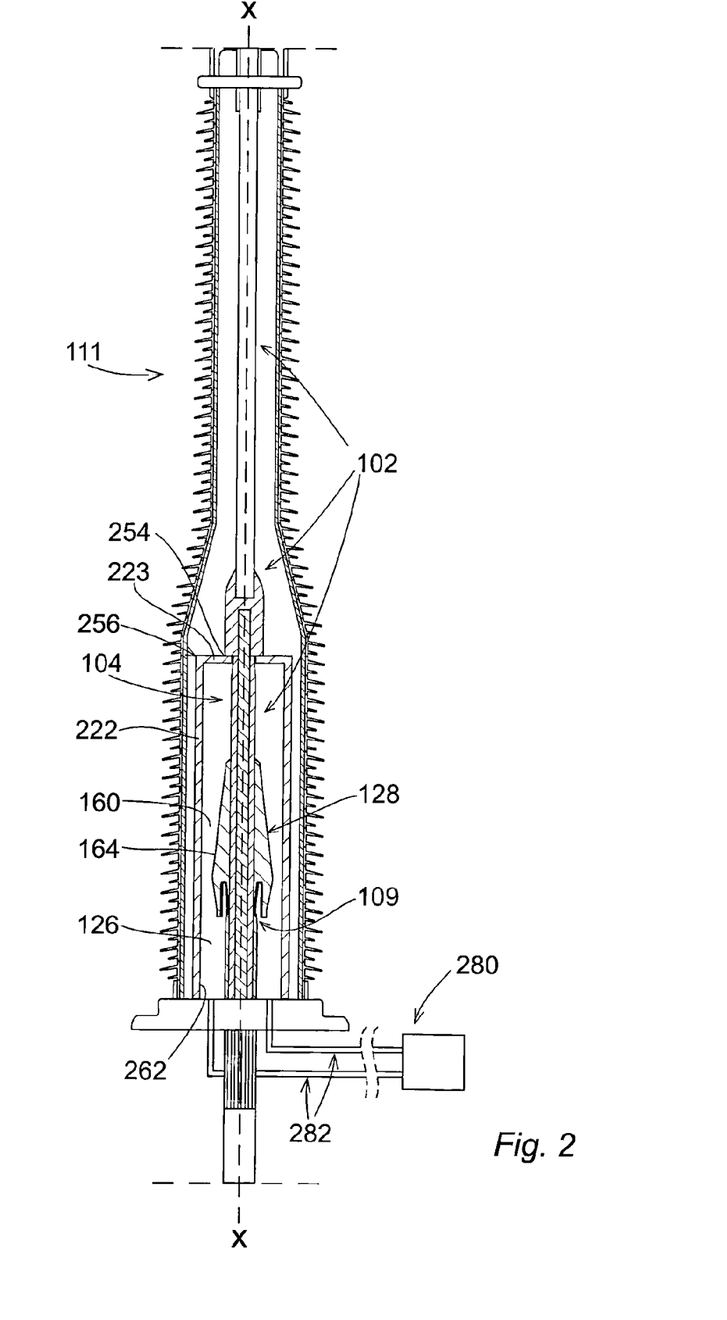
FIG. 2 is a schematic side view showing a longitudinal section of a second embodiment of the direct current cable termination apparatus according to the present invention.
Figure 3:
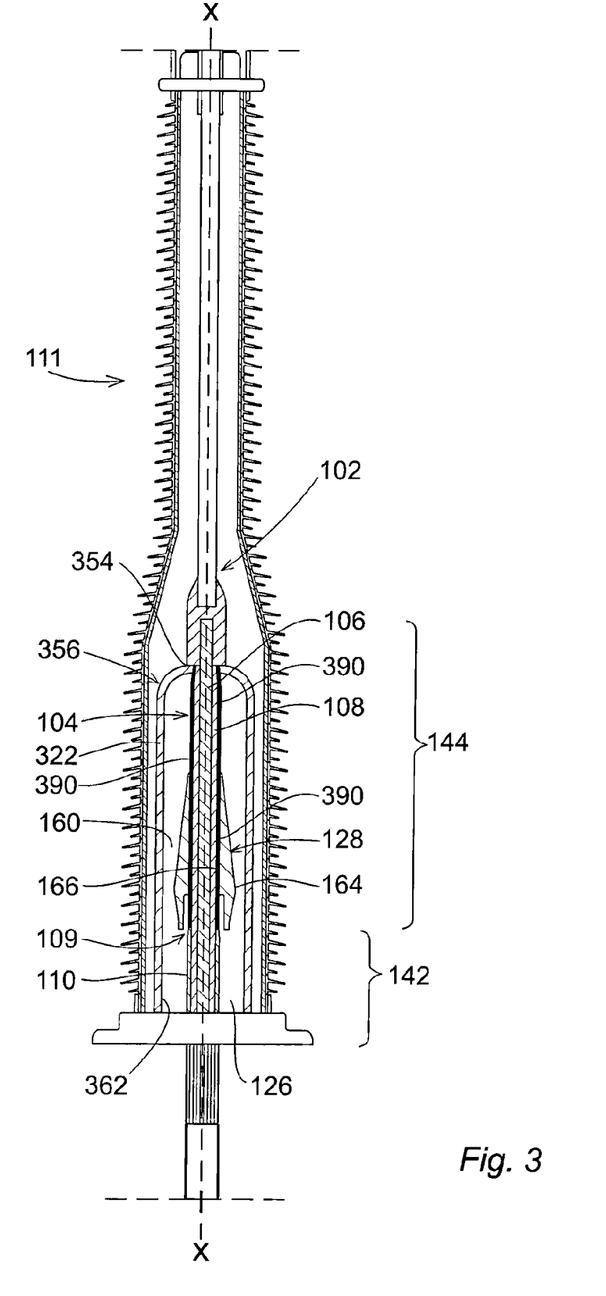
FIG. 3 is a schematic side view showing a longitudinal section of a third embodiment of the direct current cable termination apparatus according to the present invention.

FIGS. 1-3 schematically shows three embodiments of the direct current cable termination apparatus according to the present invention, for terminating a HVDC cable for high voltage (e.g. 10 kV and above, especially 50 kV and above). With reference to FIGS. 1-3, each of the three embodiments of the apparatus comprises a current-carrying device 102, or a voltage-carrying device, comprising a terminal portion 104 of the HVDC cable, the cable at least comprising a central electrical conductor 106, generally made of a suitable metal, e.g. copper or aluminium, a circumferential electrically insulating layer 108 which circumferentially surrounds and is located out-side of the electrical conductor 106, and a circumferential conductive shield 110, or layer/screen, also called outer semicon, which circumferentially surrounds and is located outside of the insulating layer 108 and the electrical conductor 106. The circumferential conductive shield 110 may be made of an electrically conducting polymer. The structure of a HVDC cable and its parts, which may comprise further layers, is well known to the skilled person and thus not discussed in more detail herein. The HVDC cable may e.g. comprise a so called inner semicon, which is a layer/screen circumferentially surrounding the electrical conductor and being located inside of the insulating layer. The inner semicon may be made of an electrically conducting polymer.

Further, the apparatus comprises a housing 111 comprising a tubular outer shell 112 with an inner periphery 114. The outer shell 112 defines a longitudinal axis x-x and is formed by an electrically insulating and polymer-containing material, e.g. a composite. The apparatus is substantially rotation symmetric around the axis x-x. The outer periphery of the outer shell 112 is provided with sheds 116, or lips/wings, for example made of silicone. The current-carrying device 102 is adapted to extend in the axial direction of the outer shell 112. Along at least a part of the axial extension of the current-carrying device 102 the outer shell 112 extends axially with a space 118 between its inner periphery 114 and the outer periphery of current-carrying device 102. The housing 111 is adapted to separate the space 118 from an atmosphere outside 120 the outer shell 112. A tubular partition 122, which is positioned around the current-carrying device 102, separates the space 118 into a first chamber 124 and a second chamber 126. The partition 122 may be made of an electrically insulating and polymer-containing material, for example glass fibre reinforced epoxy. The first chamber 124 is filled with an electrically insulating first fluid 125 in the form of an electrically insulating gas, e.g. $SF_6$, $CO_2$ or $N_2$, or a mixture thereof. The conductive shield 110 terminates inside the second chamber 126. The conductive shield 110 is terminated and forms a termination 109 in the form of a circumferential edge (also called semicon edge). An electric field control member 128, e.g. in the form of a stress cone as previously disclosed, is located within the second chamber 126 in the proximity of the termination of the conductive shield. The electric field control member 128 may comprise a rubber, polymeric or elastomeric body 129 stretched, or pushed, over the current-carrying device 102, more precisely the terminal portion 104 of the HVDC cable. The elastomeric body 129 may be mushroom-shaped. However, other materials and shapes of the elastomeric body 129 are possible. Other types of electric field control members known to the skilled person may also be used. The apparatus may also include a plurality of electric field control members, i.e. two or several electric field control members. The electric field control member could also be in the form of a linear or non-linear resistive field grading material layer, e.g. in the form of a sleeve made of a non-linear resistive material. Further, the electric field control member 128 may comprise a semiconducting, or conductive, layer 130, e.g. made of metal or a polymer material, which in conventional ways may be provided on the lower inner curved periphery of the elastomeric body 129. Alternatively, the semiconducting, or conductive, layer 130 may be embedded in the body 129 of the electric field control member 128. The semiconducting, or conductive, layer 130 may be formed and composed in various ways known to the skilled person. The conductive layer 130 may be called deflector. Advantageously, the conductive shield 110 terminates adjacent to the lower part of the electric field control member 128, below, or prior to, the triple point which is formed by the insulating material of the electric field control member 128, the insulating material of the electrically insulating layer 108, and the material of the semiconducting layer 130. The second chamber 126 is filled with an electrically insulating second fluid 127 in the form of an electrically insulating gel or an electrically insulating oil, or a mixture thereof.

The outer shell 112 has a first end portion 132 adjacent to the first chamber 124 and also adjacent to the high voltage side, where the apparatus is connected to e.g. an overhead line or bus bar etc. The outer shell 112 has a second end portion 134 adjacent to the second chamber 126. The housing 111 may comprise a first flange 138, e.g. made of a metal, at the second end portion 134 of the outer shell 112, and a second flange 152, e.g. made of a metal, at the first end portion 132 of the outer shell 112. The HVDC cable enters the outer shell 112 via the second end portion 134 and via a first opening 136 defined by the first flange 138. Along at least a part of the axial extension of the partition 122 the outer shell 112 extends axially with a gap 140 between its inner periphery 114 and the outer periphery of the partition 122. A first part 142 of the terminal portion 104 of the cable has the circumferential conductive shield 110, whereas a remainder part 144 of the terminal portion 104 of the cable has the conductive shield 110 removed, such that the insulating layer 108 is exposed. The first part 142 may be called semicon end and the remainder part 144 may be called stripped cable. The first part 142, with the conductive shield 110 present, is situated within the second chamber 126 and outside the first chamber 124.

The current-carrying device 102 includes a connecting body 146 in which the electrical conductor 106 terminates, and the insulating layer 108 may terminate in close proximity of the connecting body 146. The connecting body 146 is adapted to electrically connect the terminated electrical conductor 106 to an electrically conducting member 148, here in the form of a rod, for example made of aluminium or copper. The conducting member 148 is adapted to extend axially in the first chamber 124 and to form part of the current-carrying device 102. Herein, the entire connecting body 146 is situated within the first chamber 124 and outside the second chamber 126. The conducting member 148 may extend to the outside of the outer shell 112 and exits the outer shell 112 via a second opening 150 defined by the second flange 152. After the exit from the outer shell 112, the conducting member 148 is electrically connected to electric equipment of the high voltage side in conventional ways known to person skilled in the art. Alternatively, the conducting member 148 may be connected to the electric equipment of the high voltage side via the second flange 152, e.g. without exiting the outer shell. The partition 122 is thus situated between the connecting body 146 and the second end portion 134 of the outer shell 112, and the second chamber 126 is situated between the connecting body 146 and the second end portion 134 of the outer shell 112. The terminal portion 104 of the cable extends from the second end portion 134 of the outer shell 112 to the connecting body 146. The partition 112 abuts against the connecting body 146, and the second fluid contained in the second chamber 126 is in physical contact with the connecting body 146.

The partition 122 of the first embodiment of FIG. 1 forms a truncated cone-shaped inner shell 122 having and defining a first opening 154 at a first end 156 of the inner shell 122, and the first opening 154 seals around the current-carrying device 102, more precisely seals around the terminal portion 104 of the HVDC cable. A second open end 158 of the partition 122 is connected in a sealing manner to the first flange 138. According to an advantageous embodiment of the apparatus according to the present invention, the partition 122 extends axially with a gap 160 between its inner periphery 162 and an outer surface 164 of the electric field control member 128. According to a further advantageous embodiment of the apparatus according to the present invention, along at least a part of the axial extension of the current-carrying device 102, the partition 122 extends axially with a gap 160 between its inner periphery 162 and the current-carrying device 102.

The partition 222 of the second embodiment of FIG. 2 forms a cylinder-shaped inner shell 222 having a first basis 223 at a first end 256 of the inner shell 222. The first basis 223 is provided with a first opening 254 which seals around the current-carrying device 102, more precisely seals around the terminal portion 104 of the HVDC cable. In addition, the second embodiment of the apparatus includes a fluid circulation unit 280 connected to the second chamber 126. The fluid circulation unit 280 comprises a circuit 282 for circulation of fluid therein, and the second chamber 126 is part of the circuit 282. Further, the fluid circulation unit 280 may contain other necessary equipment found in conventional circulation units, for example means for circulating the fluid, e.g. pump means, known to the skilled person. The partition 222 of FIG. 2 extends axially with a gap 160 between its inner periphery 262 and the outer surface 164 of the electric field control member 128.

The partition 322 of the third embodiment of FIG. 3 forms an inner shell 322 having a dome-shaped end portion 356. The dome-shaped end portion 356 of the inner shell 322 is provided with a first opening 354, and the first opening 354 seals around the current-carrying device 102, more precisely seals around the terminal portion 104 of the HVDC cable. The partition 322 of FIG. 3 extends axially with a gap 160 between its inner periphery 362 and the outer surface 164 of the electric field control member 128. In addition, the third embodiment of the apparatus includes at least one circumferential field grading material layer 390 which is electrically, and in this embodiment also physically, connected to the conductive shield 110 of the terminal portion 104 of the cable, and is electrically, and in this embodiment also physically, connected to the electrical conductor 106 of the terminal portion 104 of the cable.

The at least one field grading material layer 390 is herein made of a nonlinear field grading material, FGM, e.g. a resistive field grading material with a field dependent electrical resistivity, e.g. in the form of a SiC or ZnO filler in a suitable polymer base. The FGM layer 390 has a suitable thickness. Reference is made to WO-A1-2008/076058 and EP-A1-1 736 998 for examples of FGM which may used. However, other suitable FGM may also be used.

Along at least one part of the axial extension of the current-carrying device 102 within the second chamber 126 the at least one FGM layer 390 extends axially and is positioned around the electrical conductor 106 and the electrically insulating layer 108 of the terminal portion 104 of the cable. More precisely, in this embodiment, along the remainder part 144 of the terminal portion 104 of the cable, which has the conductive shield 110 removed, the at least one FGM layer 390 extends axially and is positioned around the electrical conductor 106 and around the electrically insulating layer 108 of the terminal portion 104 of the cable. The electric field control member 128 has an inner periphery 166 facing the current-carrying device 102, and the at least one FGM layer 390 is provided such that the electric field control member 128 is positioned around the current-carrying device 102, more precisely around the terminal portion 104 of the cable, with the at least one FGM layer 390 between its inner periphery 166 and outer periphery of the current-carrying device 102. The at least one FGM layer 390 may be described as being layer sandwiched between the current-carrying device 102 and the inner periphery 166 of the electric field control member 128. The FGM layer 390 may be positioned around or cover the termination of the conductive shield 110, and the FGM layer 390 may also be positioned around or cover at least a portion of the first part 142 of the terminal portion 104 of the cable.

Further, at least a portion of the outer surface 164 of electric field control member 128, the outer surface 164 facing the partition 322, may also form part of the at least one FGM layer.

The FGM layer, or FGM layers, may be applied to the apparatus in various ways, e.g. in the form of a tape wound around the current-carrying device, in the form of a sleeve positioned around the current-carrying device, or in the form a coating or a painted layer applied to the current-carrying device.

The invention shall not be considered limited to the embodiments illustrated, but can be modified and altered in many ways by one skilled in the art, without departing from the scope the appended claims. For example, the first and second embodiments may be provided with a corresponding FGM layer as shown in FIG. 3, the first and third embodiments may be provided with a fluid circulation unit as shown in FIG. 2, and the second embodiment may have the fluid circulation unit excluded. Several other shapes and designs of the partition are possible. The central electric conductor of the cable could also be terminated outside the outer shell, and thus excluding the connecting body and the conducting member.

What is claimed is:

1. A direct current cable termination apparatus for terminating a high voltage direct current cable, the apparatus comprises
   a current-carrying device comprising a terminal portion of the direct current cable, the cable at least comprising an electrical conductor, a circumferential electrically insulating layer located outside of the electrical conductor, and a circumferential conductive shield located outside of the insulating layer and the electrical conductor,
   a housing comprising a tubular outer shell with an inner periphery, the outer shell defining a longitudinal axis and being formed by an electrically insulating and polymer-containing material,
   the current-carrying device being adapted to extend in the axial direction of the outer shell,
   along at least a part of the axial extension of the current-carrying device the outer shell extends axially with a space between its inner periphery and the current-carrying device,
   the housing is adapted to separate the space from an atmosphere out-side the outer shell, characterized
   in that the apparatus comprises a partition which separates the space into a first chamber and a second chamber,
   in that the first chamber is filled with an electrically insulating first fluid and the second chamber is filled with an electrically insulating second fluid other than the first fluid,
   in that the first fluid comprises an electrically insulating gas, and in that the second fluid comprises a liquid filler or an electrically insulating gas,
   in that the conductive shield terminates inside the second chamber, and
   in that at least one electric field control member is located within the second chamber in the proximity of the termination of the conductive shield.

2. The direct current cable termination apparatus according to claim 1, characterized in that a first part of the terminal portion of the cable has the circumferential conductive shield, whereas a remainder part of the terminal portion of the cable has the conductive shield removed, and in that the first part is situated within the second chamber and outside the first chamber.

3. The direct current cable termination apparatus according to claim 1, characterized in that the liquid filler comprises an electrically insulating gel and/or an electrically insulating oil.

4. The direct current cable termination apparatus according to claim 1, characterized in that the electrically insulating gas comprises $SF_6$, $CO_2$ and/or $N_2$.

5. The direct current cable termination apparatus according to claim 1, characterized in that the apparatus comprises a fluid circulation unit connected to the second chamber, in that the fluid circulation unit comprises a circuit for circulation of fluid therein, and in that the second chamber is part of the circuit.

6. The direct current cable termination apparatus according to claim 1, characterized in that the partition) is tubular and is positioned around the current-carrying device.

7. The direct current cable termination apparatus according to claim 6, characterized in that the partition forms a truncated cone-shaped inner shell having a first opening at a first end of the inner shell, the first opening sealing around the current-carrying device.

8. The direct current cable termination apparatus according to claim 6, characterized in that the partition forms a cylinder-shaped inner shell having a first basis at a first end of the inner shell, the first basis being provided with a first opening which seals around the current-carrying device.

9. The direct current cable termination apparatus according to claim 6, characterized in that the partition forms an inner shell having a dome-shaped end portion, and in that the dome-shaped end portion of the inner shell is provided with a first opening, the first opening sealing around the current-carrying device.

10. The direct current cable termination apparatus according to claim 1, characterized in that along at least a part of the axial extension of the partition the outer shell extends axially with a gap between its inner periphery and the partition.

11. The direct current cable termination apparatus according to claim 1, characterized in that the outer shell) has a first end portion adjacent to the first chamber and a second end portion adjacent to the second chamber, in that the current-carrying device comprises a connecting body in which the electrical conductor terminates, the connecting body being adapted to electrically connect the terminated electrical conductor to an electrically conducting member adapted to extend axially in the first chamber and to form part of the current-carrying device, and in that at least a portion of the connecting body is situated in the first chamber.

12. The direct current cable termination apparatus according to claim 11, characterized in that the entire connecting body is situated within the first chamber and outside the second chamber.

13. The direct current cable termination apparatus according claim 11, characterized in that the partition abuts against the connecting body.

14. The direct current cable termination apparatus according to claim 11, characterized in that the second fluid is in physical contact with the connecting body.

15. The direct current cable termination apparatus according to claim 1, characterized in that the partition is made of an electrically insulating and polymer-containing material.

16. The direct current cable termination apparatus according to claim 1, characterized in that the apparatus comprises at least one field grading material layer which is electrically connected to the conductive shield of the terminal portion of the cable and electrically connectable to the electrical conductor of the terminal portion of the cable, and in that along at least one part of the axial extension of the current-carrying device within the second chamber the at least one field grading material layer extends axially and is positioned around at least the electrical conductor of the terminal portion of the cable.

17. The direct current cable termination apparatus according to claim 16, characterized in that along the at least one part of the axial extension of the current-carrying device within the second chamber the at least one field grading material layer is positioned around the electrically insulating layer of the terminal portion of the cable.

18. The direct current cable termination apparatus according to claim 16, characterized in that within the second chamber a first part of the terminal portion of the cable has the circumferential conductive shield, whereas a remainder part of the terminal portion of the cable has the conductive shield removed, and in that along at least the remainder part of the terminal portion of the cable the at least one field grading material layer extends axially and is positioned around at least the electrical conductor of the terminal portion of the cable.

19. The direct current cable termination apparatus according to claim 18, characterized in that along the remainder part of the terminal portion of the cable the at least one field grading material layer is positioned around the electrically insulating layer of the terminal portion of the cable.

20. The direct current cable termination apparatus according to claim 16, characterized in that the electric field control member has an inner periphery facing the current-carrying device, and in that the electric field control member is positioned around the current-carrying device with the at least one field grading material layer between its inner periphery and the current-carrying device.

21. An electric installation, comprising a high voltage direct current cable which at least comprises an electrical conductor, a circumferential insulating layer located outside of the electrical conductor, and a circumferential conductive shield located outside of the insulating layer and the electrical conductor, and comprising a direct current cable termination apparatus for terminating the cable according to claim 1.

* * * * *